Aug. 13, 1968 B. D. LOUGHLIN 3,397,281

CHROMINANCE SIGNAL PROCESSING APPARATUS

Filed Dec. 30, 1965 2 Sheets-Sheet 1

Aug. 13, 1968 B. D. LOUGHLIN 3,397,281

CHROMINANCE SIGNAL PROCESSING APPARATUS

Filed Dec. 30, 1965 2 Sheets-Sheet 2

United States Patent Office 3,397,281

Patented Aug. 13, 1968

3,397,281

CHROMINANCE SIGNAL PROCESSING APPARATUS

Bernard D. Loughlin, Centerport, N.Y., assignor to Hazeltine Research, Inc., a corporation of Illinois Filed Dec. 30, 1965, Ser. No. 517,601
9 Claims. (Cl. 178—5.4)

ABSTRACT OF THE DISCLOSURE

Disclosed is chrominance signal processing apparatus for use in a color television receiver having a color image reproducing device. The apparatus develops a set of three color-difference signals from a supplied chrominance signal with at least two of the color-difference signals including both a D-C component and A-C components representative of color-difference information. The apparatus then translates each of the developed color-difference signals to an input of the color image reproducing device with the D-C component of only a selected one of the color-difference signals intentionally suppressed. Other embodiments are also disclosed.

Figure 1:
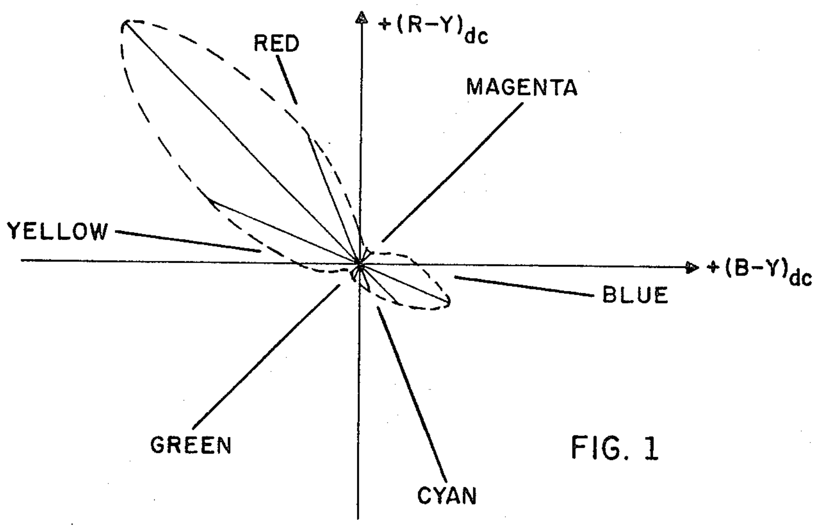

The present invention relates generally to chrominance signal processing apparatus in color television receivers. More particularly, the invention concerns apparatus for processing the chrominance signal to develop a set of color-difference signals and for translating the color-difference signals to corresponding inputs of a color image reproducing device with the D-C component of a selected one of the color-difference signals intentionally suppressed.

In the field of color receiver design, it has heretofore been the general belief that in order to achieve acceptable color image reproduction, the color-difference signals derived from the chrominance signal must be translated to the inputs of the color picture tube with their D-C components substantially unaltered. That is, the prior art teaches that every effort should be made to maintain the full D-C component of each color-difference signal at the control grids of the picture tube in order to insure acceptable color reproduction. (See Section 9.502 of the Television Engineering Handbook by Donald G. Fink and published by McGraw-Hill Book Company, and Section 15–13 of Principles of Color Television published by John Wiley and Sons, Inc.)

However, faithful reproduction of the color-difference signal D-C components requires either that the signal paths between the chrominance signal demodulators and the picture tube grids be fully D-C coupled, or that D-C restoration be provided prior to the picture tube grids. The first of these alternatives requires full D-C stabilization in each color-difference signal path, and therefore, adds greatly to the cost of the color receiver. The second alternative is more attractive, but requires additional circuit components, and therefore, still adds to the cost of the color receiver. Since the color receiver manufacturing industry is a highly competitive one, any reduction in the complexity of a color receiver which results in a cost savings, while not appreciably degrading the subjective quality of the reproduced color images, is a significant advance in the art.

It is therefore an object of the present invention to provide in a color television receiver, chrominance signal processing apparatus which eliminates the need for full D-C stabilization or D-C restoration in at least one of the color-difference signal paths by translating that color-difference signal to a corresponding input of the color image reproducing device with its D-C component intentionally suppressed.

It is another object of the present invention to provide in a color receiver, chrominance signal processing apparatus which eliminates the need for full D-C stabilization or D-C restoration in all of the color-difference signal paths by translating one of the color-difference signals to an input of the color image reproducing device with its D-C component intentionally suppressed, while translating the remaining two color-difference signals to corresponding inputs of the image reproducing device with their D-C components partially attenuated by predetermined amounts.

It is a further object of the invention to provide in a television receiver, chrominance signal processing apparatus which eliminates the need for full D-C stabilization or D-C restoration in the color-difference signal paths while maintaining grey-scale balance in the reproduced image in the face of variations in the D-C operating conditions of the receiver.

Figure 2:
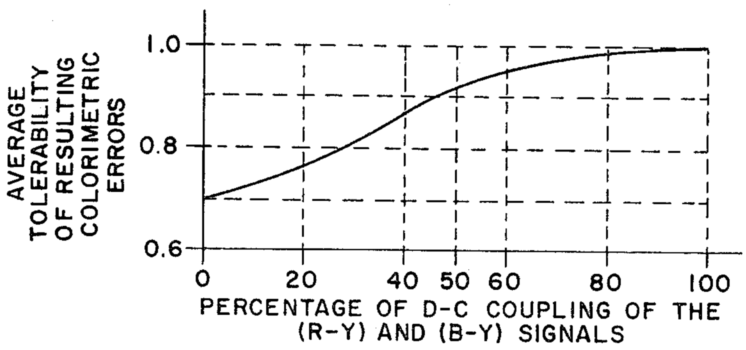
Figure 3:
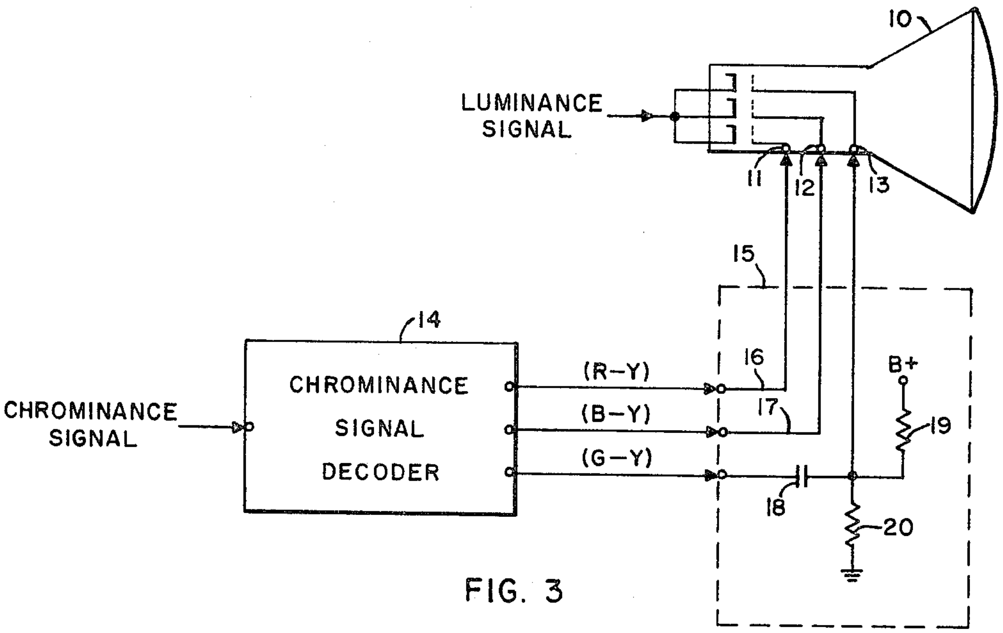
Figure 4:
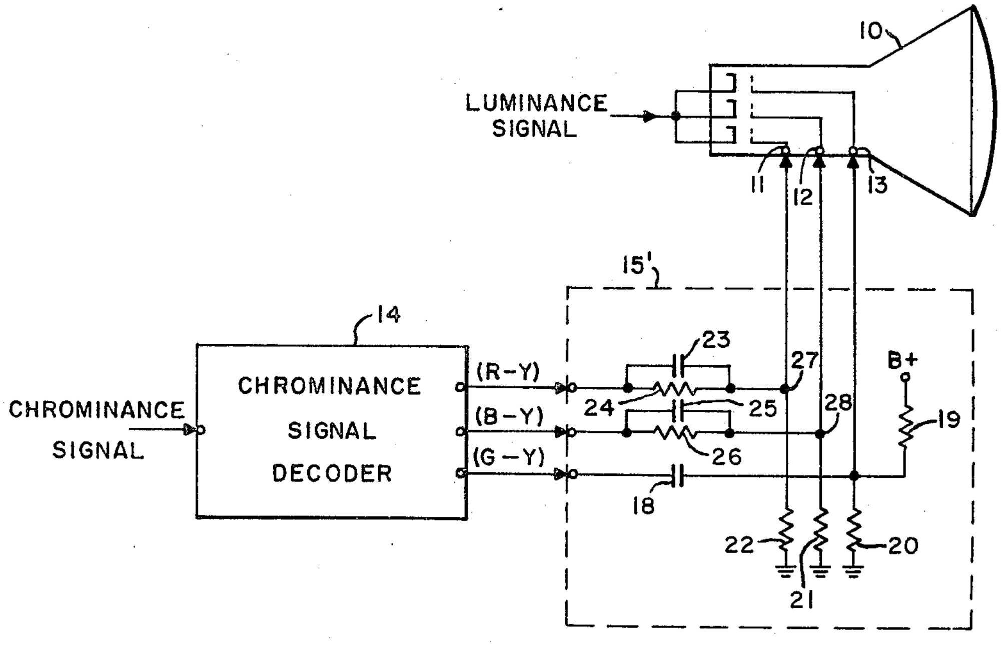
Figure 5:
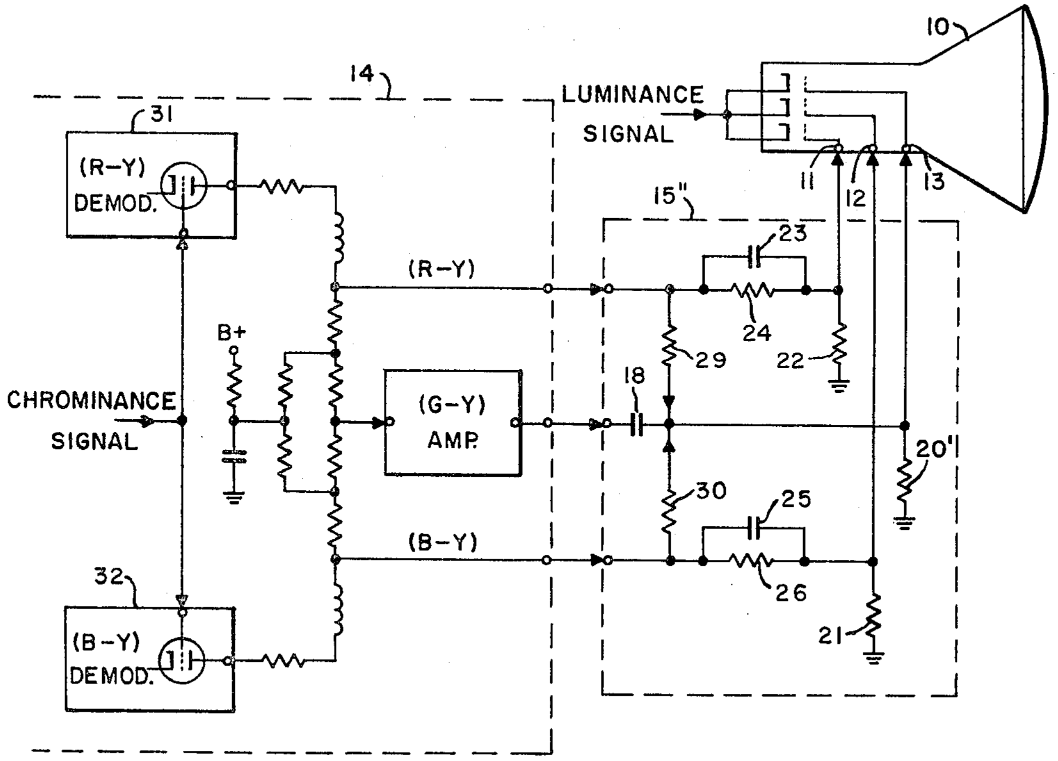

Referring to the drawings:

FIGS. 1 and 2 are graphs which are helpful in explaining the operation of the present invention, and FIGS. 3, 4 and 5 are circuit diagrams, partly schematic, of three different embodiments of the present invention.

*The invention*

It has been discovered that contrary to the teachings of the prior art, in a color television receiver the full D-C components of the color-difference signals need not be accurately reproduced, and can be intentionally attenuated in order to simplify the over-all color receiver design by eliminating the need for, and additional cost of providing, full D-C stabilization or D-C restoration in the color-difference signal paths. While it is recognized that the colorimetric reproduction obtained by attenuating the D-C components of the color-difference signals will not be truly accurate, it has been found that subjective quality of the reproduced color images, and not their colorimetric accuracy, is the determining criteria in this area. It will be shown that while attenuation of the D-C components of the color-difference signals does decrease the subjective quality of the reproduced color images, colorimetry remains within acceptable limits while the minimal extent of this degradation is more than offset by the benefits which are derived from this practice, benefits such as greater economy and simplicity, and improved stability in the over-all color receiver design.

The extent to which the D-C component of a particular color-difference signal can be attenuated without producing objectionable effects in the reproduced color images has been found to be determined by two factors.

(A) The presence of the component during reproduction of a typical color scene (i.e.: if the D-C component of a particular color-difference signal is found to be small in relation to the D-C components of the other color-difference signals during reproduction of a typical color scene, then attenuation of that D-C component can be expected to have little effect on the subjective quality of the reproduced color image).

(B) The tolerability of the viewing public to colorimetric errors caused by various amounts of color-difference signal D-C component errors for typical critical colors (i.e.: flesh-tones).

In regard to factor (A) above, it has been found that during reproduction of the majority of televised color scenes, the D-C components of the color-difference signals $(R-Y)$, $(B-Y)$ and $(G-Y)$, designated $(R-Y)_{dc}$, $(B-Y)_{dc}$ and $(G-Y)_{dc}$, will have the distribution shown in the graph of FIG. 1. The graph of FIG. 1 should not be confused with the standard chrominance signal vector diagram, but is, instead, a convenient way of representing the D-C voltage components of the color-difference signals. In the graph of FIG. 1, $(R-Y)_{dc}$ is the ordinate and $(B-Y)_{dc}$ the abscissa, with the scales of the two axes chosen to be equal. $(G-Y)_{dc}$ may be found using the formula:

$$(G-Y)_{dc}=-\frac{0.30}{0.59}(R-Y)_{dc}-\frac{0.11}{0.59}(B-Y)_{dc}$$

In the graph of FIG. 1 the length of a radial line is indicative of the number of times one will find a televised scene having a dominant color within the range of colors found in the sector having the radial line as its center line. From the graph of FIG. 1 it can be seen that in the majority of televised color scenes the predominant color can be expected to be one lying in the red-yellow region. That is, it can be expected that colors in the red-yellow region will occupy larger areas of a scene and be more saturated than colors in the green and magenta regions.

The graph of FIG. 1 illustrates two important findings. First, during reproduction of a majority of televised color scenes $(R-Y)_{dc}$ will be approximately equal in magnitude and opposite in polarity to $(B-Y)_{dc}$. Secondly, during reproduction of the majority of televised color scenes $(G-Y)_{dc}$ will be appreciably smaller than either $(R-Y)_{dc}$ or $(B-Y)_{dc}$. The second finding, when taken together with factor (A) above, leads to the discovery that the D-C component of the $(G-Y)$ color-difference signal, $(G-Y)_{dc}$, can be completely attenuated (suppressed) without serious loss of color-difference information, and therefore, without appreciably affecting the subjective quality of the majority of reproduced color images. This aspect of the invention is discussed further in the description of the particular embodiment of FIG. 3 set forth hereinafter.

The importance of the first finding above is discussed in the description of the particular embodiment of FIG. 5, set forth hereinafter.

Referring now to factors (A) and (B) above, it has been found that television viewers have the average tolerability shown in the graph of FIG. 2 for colorimetric errors in reproducted color images caused by various amounts of attenuation of the D-C components of the $(R-Y)$ and $(B-Y)$ color-difference signals. For example, from the graph of FIG. 2 it can be seen that $(R-Y)_{dc}$ and $(B-Y)_{dc}$ can be intentionally attenuated by at least twenty percent (20%) without having any appreciable effect on the average tolerability of the colorimetric errors which will occur in reproduced color images. Even more significant is the fact that the graph of FIG. 2 shows that it is possible to attenuate $(R-Y)_{dc}$ and $(B-Y)_{dc}$ by even larger amounts (such as fifty percent (50%) for example) and yet achieve reproduced color images whose subjective quality can be expected to be acceptable to a majority of television viewers, since, as shown from the graph, even for a fifty percent (50%) attenuation of $(R-Y)_{dc}$ and $(B-Y)_{dc}$, average tolerability is only reduced by approximately ten percent (10%). This aspect of the invention is discussed further in the description of the particular embodiment of FIGS. 4 and 5, set forth hereinafter.

*Description and operation of the apparatus of FIG. 3*

As described hereinabove, one aspect of the present invention is the discovery that the effects of changes in transmission of the D-C component of the $(G-Y)$ color-difference signal on color rendition in reproduced color images are subjectively negligible, and therefore, that $(G-Y)_{dc}$ may be intentionally suppressed in order to simplify the color receiver by eliminating the need for full D-C stabilization or D-C restoration in the $(G-Y)$ signal path of the receiver. In FIG. 3, there is shown apparatus which embodies this aspect of the invention. In the embodiment of FIG. 3, suppression of $(G-Y)_{dc}$ is accomplished by A-C coupling the $(G-Y)$ color difference signal to the green control grid of a color picture tube. Since this also blocks the D-C operating bias which is normally supplied to the green grid along with the $(G-Y)$ signal, it is necessary that this fixed D-C operating bias be inserted at the green grid. However, as shown in FIG. 3, this fixed bias may be easily derived from a simple resistive voltage divider.

In the embodiment of FIG. 3, 10 is a suitable color image reproducing device, such as a tricolor shadow-mask picture tube, having a luminance signal supplied to its cathodes in a conventional manner, and having separate inputs 11, 12 and 13, normally referred to as the red, blue and green grids, for three color-difference representative signals. In prior art color receivers, the $(R-Y)$, $(B-Y)$, and $(G-Y)$ color-difference signals, respectively, have been supplied to these control grids of the color tube from the outputs of a chrominance signal decoder, such as the unit 14 of FIG. 3. As is well known, decoder 14 functions to develop three color-difference signals from a supplied chrominance signal, normally by demodulating the chrominance signal directly into $(R-Y)$ and $(B-Y)$ signals, and then matirixing $(R-Y)$ and $(B-Y)$ in order to get the third color-difference signal $(G-Y)$.

Finally, in the embodiment of FIG. 3, there is included a means 15 for translating the color-difference signals $(R-Y)$, $(B-Y)$, and $(G-Y)$ to the corresponding inputs 11, 12 and 13 of the color image reproducing device 10 with the D-C component of the $(G-Y)$ color-difference signal intentionally suppressed.

In the embodiment of FIG. 3, the $(R-Y)$ and $(B-Y)$ color-difference signals are translated to the red and blue control grids 11 and 12, respectively, of the color tube 10 in unaltered form by means of direct connections via the lead wires 16 and 17 of signal translating means 15. That is, the full D-C and A-C components of the $(R-Y)$ and $(B-Y)$ color-difference signals are coupled to their respective control grids of color tube 10. However, as shown in FIG. 3, means 15 translates the $(G-Y)$ color-difference signal to the green control grid 13 of color tube 10 with the D-C component suppressed by means of the series coupling capacitor 18. As mentioned above, a fixed operating bias must be supplied to the green grid 13, and in FIG. 3 this bias is derived in the simple voltage divider consisting of resistors 19 and 20, and D-C supply B+.

It will be appreciated that with the $(G-Y)$ signal A-C coupled to the green grid of color tube 10, as shown in FIG. 3, D-C stability in that portion of the $(G-Y)$ signal path which precedes the A-C coupling capacitor 18 is no longer a problem. This permits less stringent design requirements in constructing the circuits within decoder 14 and the power supplier feeding this unit. Furthermore, since it has been shown that $(G-Y)_{dc}$ does not contribute significantly to the reproduction of subjectively acceptable color images, restoration of this D-C component subsequent to the A-C coupling capacitor 18 is also unnecessary. Thus, all that is required is a fixed D-C operating bias for the green grid of the color tube, and, as shown in FIG. 3, this can be supplied by a simple voltage divider fed from B+, or any other convenient D-C supply. Those skilled in the art will recognize that the value of this fixed bias supplied to the green grid must be selected to provide proper reproduction of the grey-scale during monochrome operation, that can be readily determined for any selected color receiver design.

*Description and operation of the apparatus of FIG. 4*

As described hereinabove, another aspect of the present invention is the discovery that it is possible to intentionally attenuate the D-C components of the $(R-Y)$ and $(B-Y)$ color-difference signals without producing an intolerable effect on the subjective quality of reproduced color images, in order to simplify the color receiver by eliminating the need for full D-C stabilization or D-C restoration in the $(R-Y)$ and $(B-Y)$ color-difference signal paths. In FIG. 4 of the drawings, there is shown apparatus which embodies both this aspect of the invention and the aspect discussed above in the description of the FIG. 3 embodiment; that is, suppression of $(G-Y)_{dc}$. In the embodiment of FIG. 4, suppression of $(G-Y)_{dc}$ is provided by A-C coupling as in FIG. 3, and in addition, $(R-Y)_{dc}$ and $(B-Y)_{dc}$ are partially attenuated by means of partial D-C coupling networks placed in both the $(R-Y)$ and $(B-Y)$ signal paths to the red and blue grids, respectively, of the color tube 10.

The $(G-Y)$ signal path in signal translating means 15' of FIG. 4 is identical with that shown in FIG. 3 and described previously above. The $(R-Y)$ and $(B-Y)$ signal paths in signal translating means 15' each consists of a partial D-C coupling network; the $(R-Y)$ network consisting of a resistive divider 22, 24, with an A-C bypass capacitor 23 connected in parallel with resistor 24, and the $(B-Y)$ network consisting of a resistive divider 21, 26 with an A-C bypass capacitor 25, connected in parallel with resistor 26. In each case the junctions 27 and 28 of the resistive dividers 22, 24 and 21, 26 are connected directly to the red and blue grids 11 and 12, respectively, of the color tube 10. In this manner, the A-C components of the $(R-Y)$ and $(B-Y)$ color-difference signals are translated directly to the red and blue grids of color tube 10 via the bypass capacitors 23 and 25, respectively, while $(R-Y)_{dc}$ and $(B-Y)_{dc}$ are attenuated by predetermined amounts (50% each, for example), in the resistive dividers 22, 24 and 21, 26. Hence, only a selected fraction (in this case ½) of the D-C components of the $(R-Y)$ and $(B-Y)$ color-difference signals are translated to the red and blue grids of color tube 10, and the fraction may be chosen from the graph of FIG. 2 as discussed hereinabove.

Those skilled in the art will appreciate that since $(R-Y)_{dc}$ and $(B-Y)_{dc}$ are partially attenuated in signal translating means 15' of FIG. 4, any undesired variations in these components caused by changes in the D-C operating characteristics of decoder 14 (due to electron device aging, power supply variation, or line voltage variation, for example) will likewise be attenuated proportionately and thus have a lesser effect on the operation of color tube 10. In this way, the apparatus of FIG. 4 can tolerate a greater degree of D-C instability in the $(R-Y)$ and $(B-Y)$ color-difference signal paths, thus eliminating the need for full D-C stabilization or D-C restoration. As discussed above in relation to the graph of FIG. 2, this improvement is obtained with a minimal decrease in the average tolerability of the viewing public to the colorimetric errors occurring in the reproduced color images as a result of the attenuation of $(R-Y)_{dc}$ and $(B-Y)_{dc}$.

*Description and operation of the apparatus of FIG. 5*

In FIG. 5 there is shown another embodiment of the invention similar to that shown in FIG. 4 and described above, but incorporating an added feature to ensure grey-scale balance. In the embodiment of FIG. 4, the fixed D-C bias applied to the green grid of color tube 10 is independent of the D-C bias voltages applied to the red and blue grids. Hence, if there were a shift in the D-C operating conditions of the color receiver (due to aging of the electron devices used as demodulators in decoder 14 for example) a change in the D-C voltages applied to the red and blue grids of color tube 10 would occur, but the D-C bias applied to the green grid would remain constant. Those skilled in the art will recognize that this produces a change in the hue of greys reproduced by the color tube. Where this shift in grey-scale is objectionable, the improvement disclosed in the embodiment of FIG. 5 may be employed.

The embodiment of FIG. 5 incorporates a simple and inexpensive cross-coupling network 29, 30 which develops a D-C bias for the green grid of color tube 10 directly from the output circuits of the $(R-Y)$ and $(B-Y)$ demodulators 31 and 32, for example in the chrominance signal decoder 14. In this way, changes in D-C voltage at the demodulator outputs (due to electron device aging, B+ variation, or line voltage variation, for example) will affect all three control grids of color tube 10, and by proper choice of resistance values for resistors 20', 29 and 30, the effects can be made to balance one another so as not to upset grey-scale balance. It will be recognized by those skilled in the art that in cases where demodulators 31 and 32 are of low-level type it may be necessary to include electron device amplifiers between the outputs of the demodulators and the inputs to signal translating means 15''. In this case the cross-coupling network 29, 30 in signal translating means 15'' would develop a D-C bias for the green grid of color tube 10 directly from the output circuits of these electron device amplifiers.

In the embodiment of FIG. 5 signal translating means 15'' is similar to that shown in FIG. 4 and described above, except that the voltage divider 19, 20 of FIG. 4 is replaced by a single resistor 20', and the resistive cross-coupling network 29, 30 is added. In the particular embodiment of FIG. 5, resistor 29 is connected from a point prior to the partial D-C coupling network 22, 23, 24 in the $(R-Y)$ signal path, to a point after the D-C blocking capacitor 18 in the $(G-Y)$ signal path. Similarly, resistor 30 is connected from a point prior to the partial D-C coupling network 21, 25, 26 in the $(B-Y)$ signal path to the aforementioned point in the $(G-Y)$ signal path.

A portion of the chrominance signal decoder 14 is shown in detail in FIG. 5 to illustrate that in this case the $(R-Y)$ and $(B-Y)$ inputs for signal translating means 15'' are taken directly from the output circuits of the $(R-Y)$ and $(B-Y)$ demodulators. The details of decoder 14 shown are conventional, except for the fact that the electron devices used as $(R-Y)$ and $(B-Y)$ demodulators in this case are inexpensive triode vacuum tubes. This is made possible by the use of signal translating means 15'', since full D-C stabilization is no longer a problem due to the suppression and attenuation of the color-difference signal D-C components by means 15'', and since the cross-coupling network 29, 30 in means 15'' can maintain grey-scale balance in the face of D-C shifts in the operating conditions of the inexpensive demodulators.

According to the teachings of the prior art, one would normally expect that the D-C components of the $(R-Y)$ and $(B-Y)$ signals, being coupled as they are in FIG. 5 to the green grid, would produce a D-C component at the green grid of the wrong polarity. However, as disclosed above in the general description of the invention, it has been discovered that during the majority of televised color scenes, $(R-Y)_{dc}$ is approximately equal in magnitude and opposite in polarity to $(B-Y)_{dc}$. Hence, the value of the D-C components produced by their being simultaneously coupled to the green grid will be very near zero during the majority of color scenes, and will therefore not appreciably affect color reproduction.

While there have been described what are, at present, considered to be the preferred embodiments of the present invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color television receiver having a color image reproducing device, chrominance signal processing apparatus comprising:

means for developing a set of three color-difference signals from a supplied chrominance signal, at least two of said color-difference signals including both a D-C component and A-C components representative of color-difference information;

and means for translating each of said color-difference signals to an input of said image reproducing device with the D-C component of only a selected one of said color-difference signals intentionally suppressed.

2. Apparatus constructed in accordance with claim 1 wherein said means for developing a set of color-difference signals develops $(R-Y)$, $(B-Y)$ and $(G-Y)$ color-difference signals, and wherein said means for translating color-difference signals translates said $(G-Y)$ color-difference signal to an input of said image reproducing device with the D-C component of said $(G-Y)$ signal intentionally suppressed.

3. Apparatus constructed in accordance with claim 2 wherein said means for translating color-difference signals translates said $(R-Y)$ and $(B-Y)$ color-difference signals to inputs of said image reproducing device with the D-C component of both said $(R-Y)$ and $(B-Y)$ signals intentionally partially attenuated by predetermined amounts.

4. Apparatus constructed in accordance with claim 1 wherein: said means for developing a set of color-difference signals develops the $(R-Y)$ and $(B-Y)$ signals which includes both a D-C component and A-C components representative of color-difference information and a $(G-Y)$ color-difference signal which includes A-C components representative of color-difference information but which has its D-C component intentionally suppressed; and said means for translating color-difference signals translates said $(G-Y)$ color-difference signal to an input of said image reproducing device with the D-C component of said $(G-Y)$ signal intentionally suppressed.

5. Apparatus constructed in accordance with claim 4 wherein said means for translating color-difference signals translates said $(R-Y)$ and $(B-Y)$ color-difference signals to inputs of said image reproducing device with the D-C component of both said $(R-Y)$ and $(B-Y)$ signals partially intentionally attenuated by predetermined amounts.

6. In a color television receiver having a color image reproducing device, chrominance signal processing apparatus comprising:

means for developing $(R-Y)$, $(B-Y)$ and $(G-Y)$ color-difference signals from a supplied chrominance signal, at least two of said color-difference signals being developed in the output circuits of two electron devices and including both a D-C component and A-C components representative of color-difference information;

and means for translating each of said color-difference signals to an input of said image reproducing device with the D-C component of only said $(G-Y)$ color-difference signal intentionally suppressed, and for deriving an operating bias for the $(G-Y)$ input of said image reproducing device from the output circuits of said two electron devices.

7. Apparatus constructed in accordance with claim 6 wherein said means for translating color-difference signals translates said $(R-Y)$ and $(B-Y)$ color-difference signals to inputs of said image reproducing device with the D-C component of both said $(R-Y)$ and $(B-Y)$ signals intentionally partially attenuated by predetermined amounts.

8. Apparatus constructed in accordance with claim 6 wherein said means for developing color-difference signals develops said $(R-Y)$ and $(B-Y)$ color-difference signals in the output circuits of said two electron devices, and wherein said $(G-Y)$ color-difference signal is developed having A-C components representative of color-difference information, and having its D-C component intentionally suppressed.

9. Apparatus constructed in accordance with claim 8 wherein said means for translating color-difference signals translates said $(R-Y)$ and $(B-Y)$ color-difference signals to inputs of said image reproducing device with the D-C component of both said $(R-Y)$ and $(B-Y)$ signals intentionally partially attenuated by predetermined amounts.

References Cited

UNITED STATES PATENTS 2,839,600 6/1958 Graser ------------- 178—5.4

ROBERT L. GRIFFIN, *Primary Examiner.*

RICHARD MURRAY, *Assistant Examiner.*